April 17, 1956  J. N. COURCHESNE  2,742,075
TIRE AND WHEEL CONSTRUCTION
Filed July 28, 1953  2 Sheets-Sheet 1
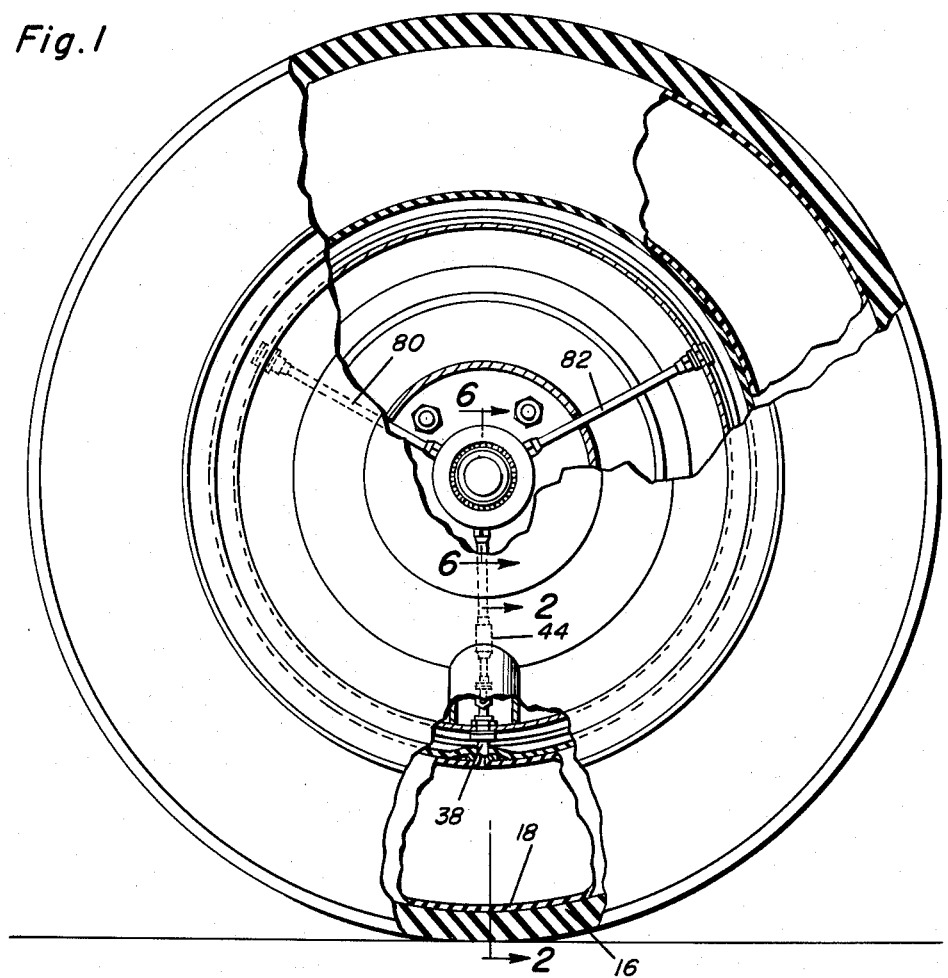
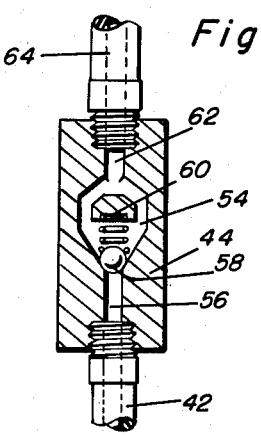
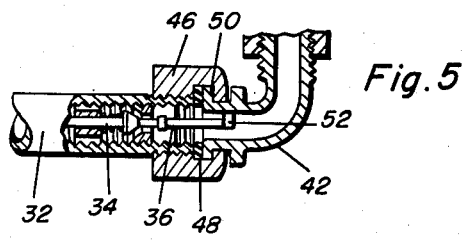
Joseph N. Courchesne
INVENTOR.

April 17, 1956     J. N. COURCHESNE     2,742,075
TIRE AND WHEEL CONSTRUCTION
Filed July 28, 1953     2 Sheets-Sheet 2
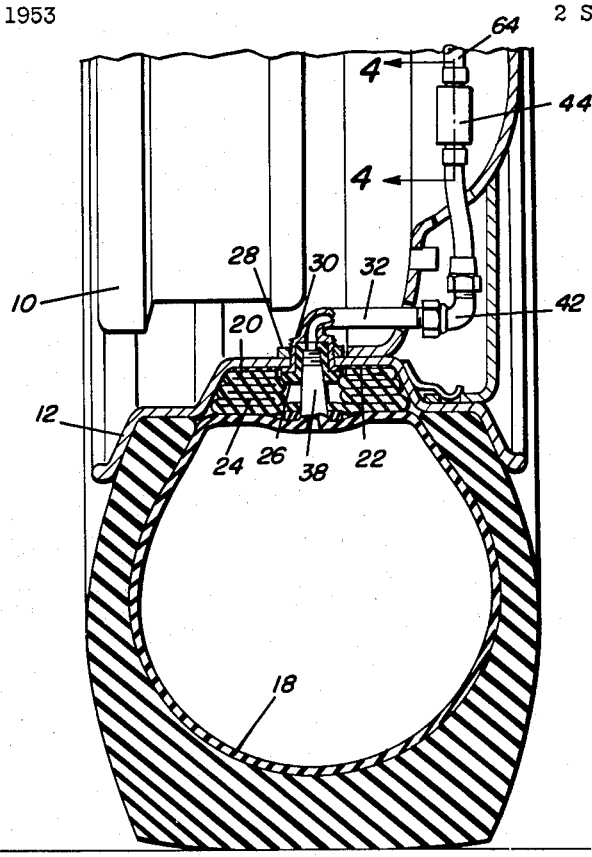
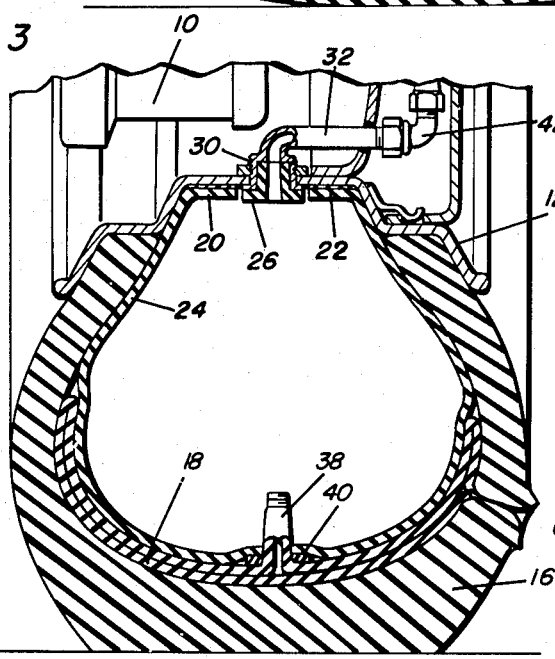
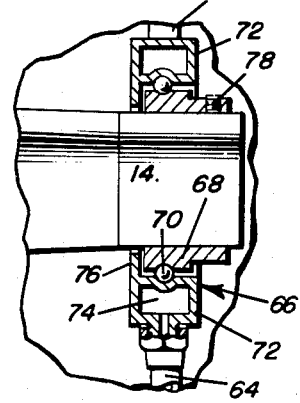
Joseph N. Courchesne
INVENTOR.

United States Patent Office 2,742,075
Patented Apr. 17, 1956

2,742,075

TIRE AND WHEEL CONSTRUCTION

Joseph N. Courchesne, Flint, Mich.

Application July 28, 1953, Serial No. 370,665

4 Claims. (Cl. 152—418)

This invention relates to vehicle wheel construction and more particularly to a pneumatic tire assembly for use in combination with the rim and axle of a wheel of a vehicle.

Pneumatic tires are subject to blow-outs due to rapid increases of pressure from heated portions of the tire caused by friction of the inner tube against the tire casing or caused by substantially instantaneous piercing of the entire casing and the tube by a foreign object, or caused by an inherent weakness in the casing, of the tire. In practically all occurrences of blow-outs, the pressure of the inner tube is substantially above that for normal operation of the tire. It is, therefore, one of the objects of this invention to provide means for safeguarding the vehicle from possible disastrous results occasioned by blow-outs while taking full advantage of the differentials in air pressure which occur during blow-outs.

The construction of this invention especially features means for connecting the inner tube of a tire assembly to an emergency tube in a manner so as to provide suitable air pressure to inflate the emergency tube should the tire blow out and the inner tube be ruptured. The means utilized include conduits attached to a swivel which is mounted on the axle of the vehicle in a manner such as to continuously apply air under pressure against the emergency tube. The emergency tube utilized in the present invention is bonded to the rim of the vehicle, and suitable valve means are utilized for inflating the inner tube and for continuously maintaining air pressure against the emergency tube.

Still further objects and features of this invention reside in the provision of a wheel and tire construction that is strong and durable, comparatively simple to install while being relatively inexpensive, and which is adapted to safeguard the lives and property of the occupants of a vehicle and while protecting the vehicle itself.

These, together with the various ancillary objects and features of the invention which will become apparent as the following description proceeds, are attained by this composite wheel and tire assembly, a preferred embodiment of which has been illustrated in the accompanying drawings, by way of example only, wherein:

Figure 1 is a side elevational view showing the tire assembly comprising the present invention with parts thereof being broken away to show other parts in greater detail;

Figure 2 is a vertical sectional view as taken along the plane of line 2—2 in Figure 1 and being shown in an enlarged scale for greater detail;

Figure 3 is a sectional detail view similar to that as shown in Figure 2 and also illustrating the manner in which the emergency tube will operate to prevent a tire casing from becoming completely deflated should a blow-out occur;

Figure 4 is an enlarged vertical sectional view as taken along the plane of line 4—4 in Figure 2 and illustrating the construction of the valve means utilized in providing a one-way passage for air from the inner tube to the emergency tube;

Figure 5 is a sectional detail view illustrating the construction of the inflation tube used for inflating the inner tube of the tire assembly; and Figure 6 is an enlarged sectional detail view as taken along the plane of line 6—6 in Figure 1 and showing the construction of the swivel in particular.

With continuing reference to the accompanying drawings wherein like reference numerals designate similar parts throughout the various views, reference numeral 10 generally indicates a wheel having a rim 12, the wheel 10 being mounted on an axle 14. Mounted on the rim 12 is a conventional tire casing 16 adapted to be inflated by an inner tube 18.

Bonded to the rim 12 are the peripheral edges 20 and 22 of an emergency tube 24. A resilient plug 26 also extends through a central portion of the rim 12 which has welded or otherwise secured thereto an internally threaded member 28. Threadedly secured in the member 28 is a plug 30 carrying a tube 32 having an inflation valve 34 mounted therein. The inflation valve is of the type conventionally used for inflating automobile tires, and includes a valve stem 36 which when held inwardly permits the flow of air into the tube 32. The resilient member or plug 26 is, of course, received in the plug 30. An inlet conduit 38 connects the inner tube 18 with the plug 26. This conduit 38 is adapted to become detached from the plug 26 when subjected to a predetermined and sufficient amount of pressure. A resilient member 40 forms an air-tight seal with the emergency tube 24 where the stem or conduit 38 extends therethrough.

A connecting element 42, as is shown best in Figure 5, is provided for connecting the inflation valve 34 to a one-way valve 44. A collar 46 is threadedly engaged on the tubular member 32 which is externally threaded. The collar 46 is provided with a recess 48 for reception of a flange 50 mounted on the connector 42. Thus, upon suitable rotation of the collar 46, the tubular member 32 may be drawn into engagement with the connecting member 42. A downwardly extending detent 52 is mounted in the interior of the connecting member 42 and is adapted to engage the outermost end of the valve stem 36 to depress it inwardly to hold the valve open when the connecting element is securely joined in communication with the valve 34. The one-way valve 44 is thus shown in Figure 4, and includes a chamber 54 communicating through an inlet aperture 56 to the connecting member 42. A ball check valve member 58 is mounted in the chamber 54 and is continuously urged to a closed position by spring 60. However, the ball check valve member 58 will be displaced upon application of suitable pressure thereon due to pressure built up in the tire just prior to a blowout. The chamber 54 communicates by means of a passageway or aperture 62 to the conduit 64.

The conduit 64 is connected to a swivel which is best shown in Figure 6 and is generally indicated by reference numeral 66. This swivel includes a bearing member 68 carrying ball bearings 70 which engage a suitable recess in a chamber 72 provided with an air passageway 74 therein concentric with the axle 14 with which the conduit 64 is in communication. A flange 76 is mounted on the chamber 72 so as to retain the chamber 72 in relative position with respect to the bearing member 68. The bearing member 68 may be locked to the axle 14 by a suitable set screw 78 or by other suitable means. Connected to the chamber 72 are tubular conduits 80 and 82 which extend through the rim 12 and are in communication with the emergency tube 24. Hence, upon inflation of the inner tube 18 to the desired pressure, upon connection of the connecting member 42 with the tubular member 32 and valve 34, pressure will be applied through the conduit 64 and through the conduits 80 and 82 onto the emergency tube. As the air pressure builds up in the inner tube just prior to a blowout, this pressure will also be applied upon the emergency tube. However, when a blow-out occurs, there being no pressure upon the ball check valve member 58, no air will flow in this valve from the emergency tube and to the inner tube, and the emergency tube will expand somewhat from the position as shown in Figure 2 to the position as is shown in Figure 3 to cushion the wheel against a too rapid deflation which might cause a serious accident.

Since from the foregoing, the construction and advantages of this composite wheel and tire assembly are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A pneumatic vehicle tire and wheel construction comprising a wheel mounted on an axle, a swivel mounted on said axle, a tire casing mounted on the rim of said wheel, an inner tube received in said casing, an emergency tube bonded to said rim and positioned between said inner tube and said rim, and means including a conduit and a tubular member connected to said swivel interconnecting said inner tube and said emergency tube when said inner tube is inflated, a conduit communicating with said inner tube, said tubular member communicating with said emergency tube, and a one-way valve adapted to control flow of air between said conduit and said tubular member, said valve only permitting fluid flow from said inner tube to said emergency tube, said swivel being hollow and having an air passageway concentric with said axle, said conduit and said tubular member being in communication with said air passageway.

2. A pneumatic vehicle tire and wheel construction comprising a wheel mounted on an axle, a swivel mounted on said axle, a tire casing mounted on the rim of said wheel, an inner tube received in said casing, an emergency tube bonded to said rim and positioned between said inner tube and said rim, and means including a conduit and a tubular member connected to said swivel interconnecting said inner tube and said emergency tube when said inner tube is inflated, a conduit communicating with said inner tube, said tubular member communicating with said emergency tube, and a one-way valve adapted to control flow of air between said conduit and said tubular member, said valve only permitting fluid flow from said inner tube to said emergency tube, said swivel including a bearing mounted on said axle, a chamber rotatably mounted on said bearing, said chamber being hollow and having an air passageway concentric with said axle, said conduit and said tubular member being in communication with said air passageway.

3. A pneumatic vehicle tire and wheel construction comprising a wheel mounted on an axle, a swivel mounted on said axle, a tire casing mounted on the rim of said wheel, an inner tube received in said casing, an emergency tube bonded to said rim and positioned between said inner tube and said rim, and means including a conduit and a tubular member connected to said swivel interconnecting said inner tube and said emergency tube when said inner tube is inflated, a conduit communicating with said inner tube, said tubular member communicating with said emergency tube, and a one-way valve adapted to control flow of air between said conduit and said tubular member, said valve only permitting fluid flow from said inner tube to said emergency tube, said swivel being hollow and having an air passageway concentric with said axle, said conduit and said tubular member being in communication with said air passageway, said conduit including an inflation valve extending through said emergency tube and in communication with said inner tube, said inflation tube being detachably secured to the rest of said conduit.

4. A pneumatic vehicle tire and wheel construction comprising a wheel mounted on an axle, a swivel mounted on said axle, a tire casing mounted on the rim of said wheel, an inner tube received in said casing, an emergency tube bonded to said rim and positioned between said inner tube and said rim, and means including a conduit and a tubular member connected to said swivel interconnecting said inner tube and said emergency tube when said inner tube is inflated, a conduit communicating with said inner tube, said tubular member communicating with said emergency tube, and a one-way valve adapted to control flow of air between said conduit and said tubular member, said valve only permitting fluid flow from said inner tube to said emergency tube, said swivel including a bearing mounted on said axle, a chamber rotatably mounted on said bearing, said chamber being hollow and having an air passageway concentric with said axle, said conduit and said tubular member being in communication with said air passageway, said conduit including an inflation valve extending through said emergency tube and in communication with said inner tube, said inflation tube being detachably secured to the rest of said conduit.

References Cited in the file of this patent

UNITED STATES PATENTS

| 1,800,780 | Daneel | Apr. 14, 1931 |
| 1,972,770 | Gillespie | Sept. 4, 1934 |
| 2,107,405 | Williams | Feb. 8, 1938 |

FOREIGN PATENTS

| 23,859 | Great Britain | 1908 |